United States Patent [19]
McClure et al.

[11] Patent Number: 5,799,982
[45] Date of Patent: Sep. 1, 1998

[54] ADHESIVE STICKER LABELING SYSTEM FOR USE IN IDENTIFYING COMPACT DISKS

[76] Inventors: Neil L. McClure, 1220 S. Laird Ct., Superior, Colo. 80027; Ralph Wieland, 215 Powderhorn Trail, Broomfield, Colo. 80020

[21] Appl. No.: 620,251

[22] Filed: Mar. 22, 1996

Related U.S. Application Data

[63] Continuation-in-part of Ser. No. 573,446, Dec. 15, 1995.
[51] Int. Cl.[6] ................................................. B42D 15/00
[52] U.S. Cl. .......................................... 283/81; 283/72
[58] Field of Search ............................ 283/81, 56, 80, 283/79, 74, 72; 40/340

[56] References Cited

U.S. PATENT DOCUMENTS

| | | | |
|---|---|---|---|
| 3,039,218 | 6/1962 | Whiting et al. | 40/340 |
| 3,578,539 | 5/1971 | Lash | 40/340 X |
| 4,385,460 | 5/1983 | Hanna | 40/340 |
| 4,726,007 | 2/1988 | McCormack | 369/286 |
| 4,983,437 | 1/1991 | Merrick | 428/40 |
| 5,435,246 | 7/1995 | Edman | 101/333 |

*Primary Examiner*—Willmon Fridie, Jr.
*Attorney, Agent, or Firm*—Duft, Graziano & Forest, P.C.

[57] ABSTRACT

A compact disk identification system (50) utilizes a destructible adhesive sticker (20, 202, 204, 206) to identify the owner of a compact disk (40). The sticker includes a top layer (22) that is marked with printed indicia (26) providing ownership information. The top layer is backed by an adhesive face (34) covered with an adhesive providing an adhesive strength exceeding the tear strength of the top layer. The top layer is affixed to the compact disk using a base plate (52) and a pestle (54) having a central cylinder (62). A very close tolerance between the cylinder, the disk, the top layer, and the pestle provides a substantially perfect central alignment of the top layer on the disk. The stickers are also used in conjunction with a computer program (P300) providing data storage management function.

4 Claims, 5 Drawing Sheets

ADHESIVE STICKER LABELING SYSTEM FOR USE IN IDENTIFYING COMPACT DISKS

BACKGROUND OF THE INVENTION

RELATED APPLICATIONS

This application is a continuation-in-part of copending application Ser. No. 08/573,446 filed Dec. 15, 1995.

FIELD OF THE INVENTION

The present invention pertains to the field of methods and apparatus for use in labeling compact disks. More specifically, the method and apparatus utilizes adhesive stickers to affix ownership information or a data file management identifier to the compact disk.

STATEMENT OF THE PROBLEM

Compact disks are optical storage media used to store sound recordings, computer programs, video data, or computer-accessible data. The disks are typically made of a plastic material in which laser-readable data tracks are embedded. A single disk may contain up to about 9.5 gigabytes of stored data in tens of thousands or more data files. In recent years, compact disks have become the medium of choice for sales of sound recordings and large compilations of personal computer-accessible information because the disks are very small and can store tremendous amounts of information. Compact disk drives that can read and write data to the disks have entered the commercial marketplace. Information is stored on these disks so densely that there is now a problem with managing the data stored on a plurality of disks for access and retrieval.

Compact disk users often expend large sums of money to acquire a collection of compact disks. For example, it requires eight-hundred dollars to acquire a small-to-medium sized collection of fifty sound recording disks having an average cost of sixteen dollars apiece. Compact disks that are used with computers can each be worth fifty to a hundred dollars or more. The cost of replacing a collection of compact disks can be substantial. Additionally, many disks cannot even be replaced because the production run of that particular disk has ended or is out of date.

Compact disks are often stolen or misplaced. A thief can quickly and easily remove the disks from a disk storage location in a home or an automobile. The stolen disks are easily concealed in a pocket or purse. Specialty shops that deal in the resale of sound recording disks have enhanced the market for stolen disks. In other instances, an individual may lend a disk to another person who forgets to return the disk to its rightful owner.

U.S. Pat. No. 5,435,246 describes a labeling kit that can be used to stamp compact disks with printed indicia which serves to identify the owner of the compact disk. A number of problems derive from the use of ink on the stamping apparatus. Blurring of the printed indicia on the compact disk occurs as the stamp is inadvertently rotated while it is compressed against the compact disk. Additionally, the dried ink is readily scratched from the plastic to which it is applied. The removal of ink from the compact disk erases all evidence of prior ownership. Inadvertent scratching of the ink produces a residue that may interfere with the internal components of the disk drive mechanisms which are used to read information form the disk.

There exists a need to identify the storage location of data files that are stored on compact disks.

SOLUTION

The present invention overcomes the problems that are outlined above by providing an adhesive sticker or label that is printed with an identifier. The sticker can be applied to the compact disk through the use of a special labeling system. The present invention also contemplates tracking information stored on a plurality of disks ownership through a data management database, i.e., a data file catalog that associates stored data files on the respective disks with an identifier that is unique to a selected one of the disks.

An adhesive sticker according to the present invention has dimensions that permit the sticker to be affixed to a compact disk in the central portion of the disk where the drive mechanism clamps onto the disk for read and write operations. The sticker is made within a range of tolerances that do not interfere with operation of the disk drive. The ANSI specifications for drive mechanism design specify that disk drives should at least be able to accommodate compact disks having thicknesses varying from 1.1 to 1.5 mm. Thus, it is recommended (though not necessarily essential in all cases) that the combined thickness of the compact disk combined with the stickers attached thereto not exceed this value. The stickers are cut with a central aperture having a sufficient diameter (e.g., greater than 15 mm) to circumscribe the central opening in a compact disk without protruding into the opening where the sticker would, otherwise, interfere with the operation of the disk drive mechanism. The sheet of material preferably has a thickness ranging up to about 0.4 mm, with a thickness ranging from 0.03 to 0.3 being most preferred. Thicker materials add excessive weight that can interfere with the operation of the disk drive mechanism because most disks (without stickers) average 1.2 mm in thickness. Thin stickers are preferred because relatively thicker materials also sometimes build thickness on the disk to a point that exceeds the design tolerance of the disk drive mechanism. The most preferred sticker thickness ranges from 0.03 to 0.2 mm. The outer sticker diameter is preferably less than 29.2 mm because this diameter corresponds to the size of a central depression that is found on most commercially available sound recording disks. The sticker preferably has a plurality of radial notches.

The sticker is formed of a circular or rounded sheet of material having a first face that bears printed indicia which serves to identify the disk or the owner of the disk. The circular sheet of material has an adhesively backed second face that is remote from the first face. The adhesive on the second face preferably adheres to the plastic of a compact disk with a force that normally precludes removal of the circular sheet of material without tearing thereof. This feature of the sticker adhesive makes the sticker destructible in the event that someone attempts to remove the sticker from the compact disk; however, the invention also contemplates the use of removable labels having other adhesives.

The sticker is preferably affixed to the compact disk through the use of a special labeling system. The labeling system includes a base plate having a central upwardly raised platform and a central cylinder that is raised to a greater height than the platform. A pestle is used to press the sticker against the compact disk when the cylinder is inserted through a hole in the disk and a central opening in the sticker. The system serves to align the sticker on the disk.

The stickers also permit use of a computer (e.g. computer 78 of FIG. 3) that is programmed to print indicia on a sheet of pre-cut stickers. The indicia identifies the disk to a database that includes a catalog of data files stored on the disk. Thus, it is possible to identify the specific disk where a data file resides by searching the database without having to search individual disks.

Other salient features, objects, and advantages will be apparent to those skilled in the art upon a reading of the discussion below in combination with the accompanying drawings.

DETAILED DESCRIPTION OF THE PREFERRED EMBODIMENT

Figure 1:
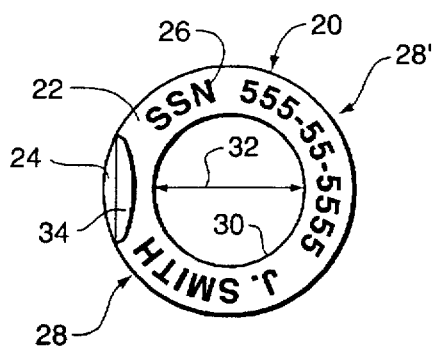
FIG. 1 depicts an adhesive sticker according to the present invention.

FIG. 1 depicts a top plan view of a circular identification sticker 20. Sticker 20 is a laminate that includes a top layer 22 and a release layer 24. The upper face of top layer 22 bears printed indicia 26 including ownership identification information, e.g., the social security number 555-55-5555 for one John Smith as the owner of the disk. Indicia 26 can include other information, such as a telephone number with a request to call that number, or an alphanumeric sequence that is a unique identifier to a central computer database. Indicia 26 also preferably includes information (e.g., a telephone number) describing how to contact an ownership registration database. For example, indicia 26 could recite in small print "Telephone (777) 777-7777 for ownership registration information." Indicia 26 is preferably printed with permanent or indelible ink, such as the 99S150 ink made by Colonial Printing Inks. Indicia 26 may also be printed by computer system connected to a conventional laser printer.

Top layer 22 is preferably made of a vinyl material having a thickness no greater than about 0.4 mm. The thickness preferably ranges from 0.02 mm to 0.08 mm. Greater thicknesses can interfere with the operation of a compact disk. Top layer 22 has a maximum diameter taken across line 28-28' that preferably does not exceed 29.2 mm, as a greater dimension can cover data tracks on a two-sided compact disk. Layer 22 has a central circular opening 30 that preferably presents a diameter greater than 15 mm taken across line 32. The diameter across line 32 even more preferably exceeds 16.5 mm. As depicted in FIG. 1, layer 22 is peeled away from release layer 28 to reveal an adhesive-covered face 34. The adhesive on face 34 preferably has a strength of adherence that exceeds the strength of top layer 22 when the adhesive is affixed to a compact disk. Thus, the top layer 22 cannot be removed from a compact disk without destroying or tearing top layer 22. Suitable adhesives for this application are classified in the industry as permanent pressure sensitive adhesives. Specific adhesives can be tested for suitability by applying the adhesive to a sticker, such as sticker 20, applying the sticker to a compact disk, and attempting to remove the sticker without destroying the sticker.

Release layer 24 is preferably a silicone-covered release paper. As depicted, release layer 24 can be formed to the exact dimensions of top layer 24, or it can be made in square sheets that carry a plurality of pieces formed as top layer 22.

Figure 2:
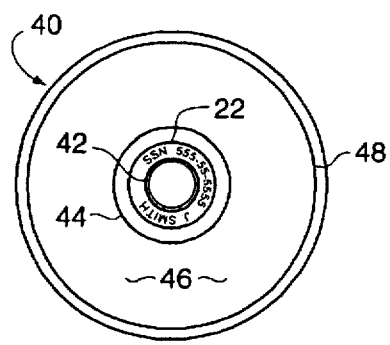
FIG. 2 depicts a top plan view of the FIG. 1 adhesive sticker, as it appears installed on the upper surface of a compact disk.

FIG. 2 depicts a top plan view of top layer 22 of sticker 20 affixed to a standard compact disk 40. Disk 40 is a conventional plastic sound recording disk. Micrometer measurements conducted on a commercially acquired disk 40 indicate a maximum outer diameter of 120 mm, a central hole 42 having an outer diameter of 15 mm, and a circular central ring 44 circumscribing hole 42 to an outer diameter of about 34 mm and an inner diameter of about 33 mm. Exact specifications for commercially available sound recording compact disks are found in ANSI specifications, and the exact dimensions in use may be obtained from the disk manufacturers of different types of commercially available optical storage disks. Ring 44 circumscribes a central region 46 that extends between ring 44 and a radially outboard margin 48. Region 46 includes a plurality of conventional data tracks that contain stored information corresponding to a sound recording or computer data. Region 46 may also contain any other type of data. The data tracks in region 46 are accessed by a compact disk drive mechanism from a face 47 (see FIG. 3) of disk 40 that is remote from top layer 22. Ring 42 is compressibly engaged by conventional compact disk drive mechanism (not depicted).

Figure 3:
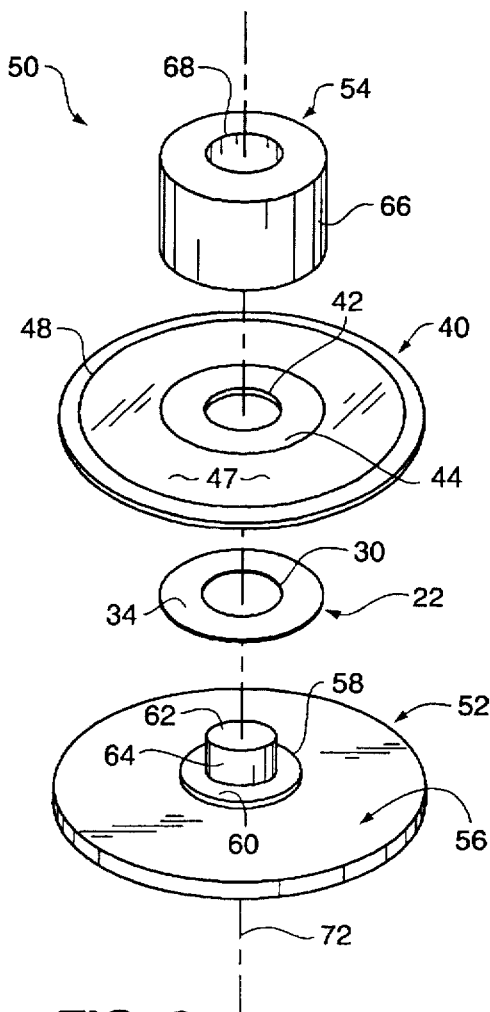
FIG. 3 depicts a front elevational perspective view of a labeling system that is used for affixing the FIG. 1 adhesive sticker to the compact disk as shown in FIG. 3.

FIG. 3 depicts a labeling system 50 for use in applying top layer 22 of sticker 20 to a compact disk 40 as depicted in FIG. 2. Labeling system 50 includes an integrally formed base plate 52 and a pestle 54, which are both preferably made of a synthetic resin. Base plate 52 includes a flat cylindrical bottom support member 56. The central portion of bottom support member 56 includes an upwardly raised circular platform 58 having a flat upper face 60 and an outer diameter equal to the inner diameter of ring 44. Platform 58 is preferably raised above bottom support member 56 to present face 60 at a height of at least 1.5 mm above bottom support member 56. The central portion of platform 58 includes an upwardly raised cylinder 62 that preferably has an outermost diameter providing a close tolerance of no more than about 0.2 mm between the outermost diameter of a sidewall 64 and the innermost diameter of hole 42. The 0.2 mm tolerance also preferably exists between the outermost diameter of sidewall 64 and the innermost diameter of opening 30. Bottom support member 56, central platform 58, and cylinder 62 are preferably formed as one piece of injection-molded synthetic resin.

Pestle 54 is preferably a tubular member having an outer wall 66 circumscribing a central aperture 68. Aperture 68 preferably has an inner diameter equal to the inner diameters of hole 42. The opposite (upper and lower) ends of outer wall 66 include flat faces, e.g., face 70.

In operation, compact disk 40 is acquired from a commercial source. At this time, disk 40 does not include an adhesive sticker 20. The owner peels top layer 22 away from release layer 24, and places top layer 22 on base plate 52 by inserting cylinder 62 through hole 30 with indicia 26 facing surface 60. Thus, adhesive face 34 is exposed upwardly away from surface 60.

In the next step, the owner places disk 40 on base plate 52 by aligning hole 42 with cylinder 62 along centerline 72, and causing cylinder 62 to pass through hole 42. In this configuration, the surface of region 46 rests on adhesive face 34 which is, in turn, supported by surface 60. Thus, a gap substantially equal to the height of raised platform 58 and the thickness of sticker 20 exists between disk 40 and bottom support member 56. This gap prevents scratching of disk 40 that, otherwise, would occur if disk 40 were permitted to contact bottom support member 56. Disk 40 is retained on platform 58 in a substantially perfect central alignment with respect to centerline 72 by virtue of the close 0.2 mm tolerance between sidewall 64 and the inner diameter defining hole 42.

Top layer 22 is firmly affixed to disk 40 by using pestle 54 to compress top layer 22 against region 46. Cylinder 62 is inserted into aperture 68, and a flat face, e.g., the face remote from face 70, of pestle 54 is compressed against top layer 22 forcing adhesive face 34 against the upper surface of region 46. The side of region 46 remote from top layer 22 is, in turn, forced against face 60 of raised platform 58.

Pestle 54 and disk 40 including top layer 22 are subsequently removed from their respective positions surrounding cylinder 62. Top layer 22 bears indicia that serves to identify the owner of disk 40. Someone who subsequently attempts to remove top layer 22 from its location on disk 40 finds that task to be extremely difficult, if not impossible. The adhesive that coats adhesive face 34 adheres to face 34 of top layer 22 and the plastic of region 46 with a strength that exceeds the strength of the material in top layer 22. This strong adhesive prevents peeling of top layer 22 away from its position adjoining region 46. Top layer 22 can only be removed by scraping or by exposure to elevated temperatures. Both of these actions, if taken to remove top layer 22, would carry a substantial risk of destroying disk 40 for use in its intended data storage role. Scrape marks or residual adhesive would remain even after the removal of top layer 22, and these residual effects of sticker removal would substantially degrade the resale value of disk 40, and may preclude its use in a drive mechanism.

Figure 4:
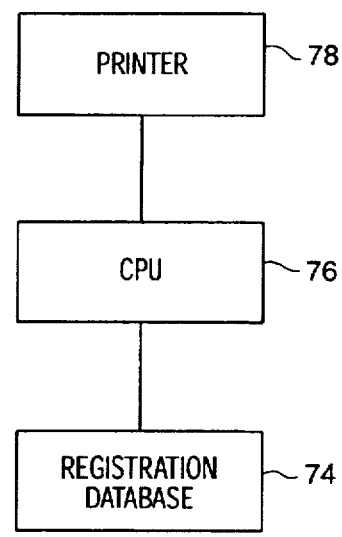
FIG. 4 depicts a computer system used to track ownership information and manage data stored on disks that have been labeled according to the present invention.

The owner preferably purchases a plurality of identification stickers, such as sticker 20, from a commercial supplier of these stickers. The commercial supplier also preferably provides a service that accesses a computerized ownership registration database. FIG. 4 depicts this database as database 74 connected to personal computer 76 and laser printer 78. In this case, the portion of indicia 26 reading SSN 555-55-5555 serves to identify John Smith as the disk owner. The computer database is able to provide an address and telephone number for John Smith. Thus, a police agency or used disk reseller who suspects a disk is stolen can contact the central registry for purposes of identifying a possible true owner of the disk. The supplier is able to supply the police agency or other interested party with information that permits the police agency to contact the possible true owner. Additionally, the database may be as simple as a sheet of paper that a library uses to track disks having identification numbers (e.g. Dewey decimal numbers) as indicia 26.

Other materials may be substituted for the preferred materials that are described above. For example, top layer 40 may be made of a paper material, and a suitable adhesive may be selected for use with the paper. The use of paper is preferably accompanied by the use of an indelible printing ink or laser printer toner. The paper material carries the disadvantage of the top layer 22 being easier to remove through the use of solvents (e.g., water) that do not degrade the preferred vinyl material. Nevertheless, it is sometimes desirable to use a commercially available adhesive having a binding capacity that permits the sticker top be easily removed in one piece. Bottom support member 56 never contacts disk 40, and may assume any geometric configuration, e.g., as a square, a rectangle, or a rhombus. The preferred dimensions recited are particularly preferred for use with conventional sound recording disks that are presently on the market, but may be varied to conform with other standard disk sizes that may arise in the future.

Figure 5:
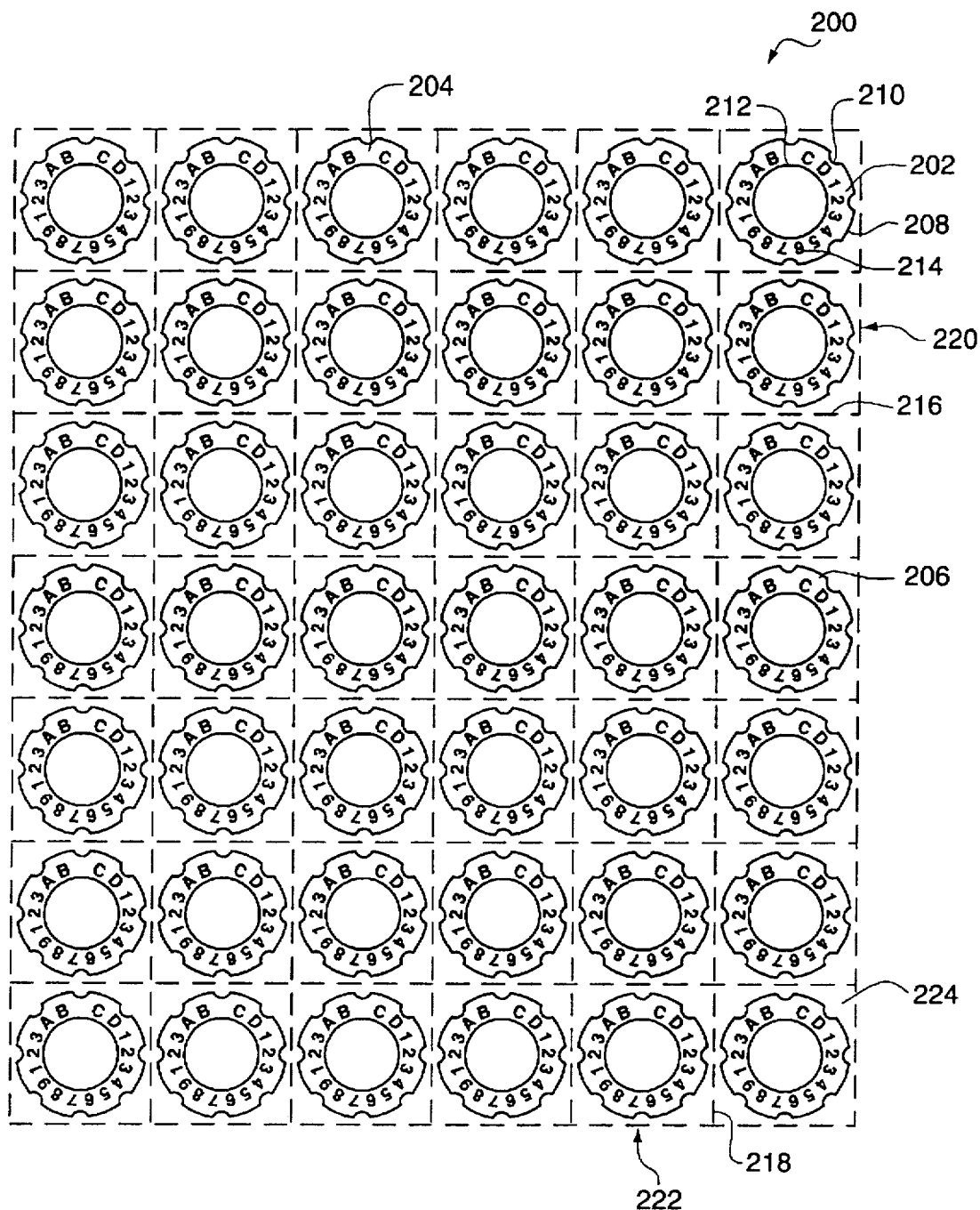
FIG. 5 depicts a sheet containing a plurality of adhesive stickers constituting a second embodiment of the present invention.

FIG. 5 depicts a sheet 200 including a plurality of release-backed adhesive stickers, e.g., stickers 202, 204, and 206, which are formed in sheet 200. Individually, stickers 202–206 are identical to sticker 20 of FIG. 1, except that the FIG. 1 sticker is cut or stamped differently. Using sticker 202 as an example, cut line 208 defines an outer margin including a plurality of equally spaced semicircular notches (e.g., notch 210) extending inboard towards the center of sticker 202. A second cut line 212 forms a circular center having a slightly larger radius than that of the FIG. 1 sticker 20. Prior to use, stickers 202–206 can be separated from sheet 200 by separating them from the surrounding material at their respective cut lines 210 and 212 and peeling them away from a conventional release layer (not depicted in FIG. 5). Notches 210 facilitate removal of stickers 202–206 (this is sometimes desirable) by providing places where a fingernail or other tool can more easily be inserted between a sticker and the corresponding disk to which it is attached.

Sheet 200 is preferably precut to form stickers 202–206 prior to the time that indicia (e.g., indicia 214) is printed on the stickers. An especially preferred form of the invention includes using a conventional sheet 200 of stickers having tear lines 216 and 218 formed therein to permit separation of sheet 200 into respective rows (e.g., row 220), columns (e.g., column 222), and squares (e.g., square 224), as desired. These tear lines permit separation of the printed stickers for easier storage by the user.

Figure 6:
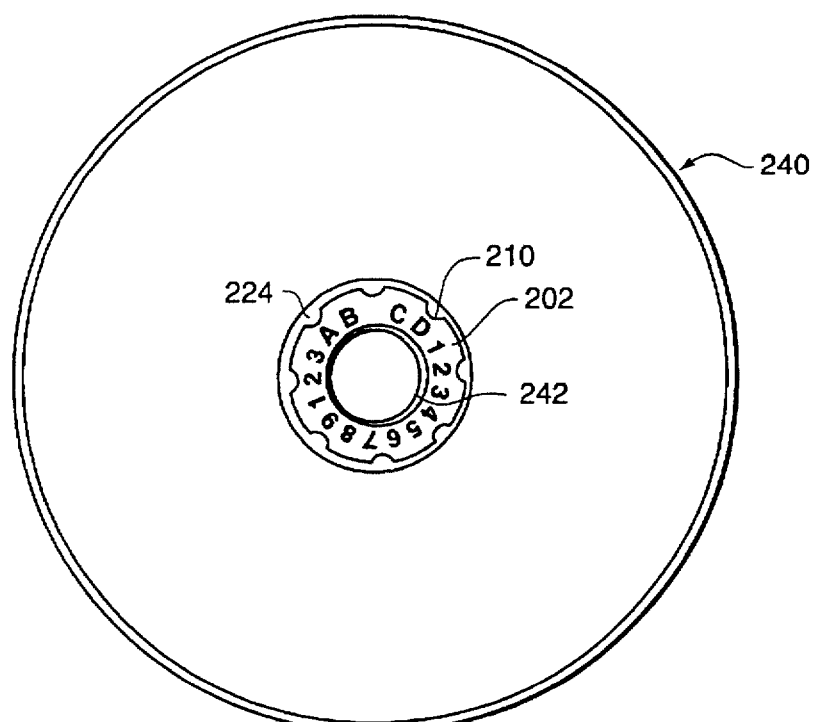
FIG. 6 depicts one of the FIG. 5 adhesive stickers installed on the surface of a compact disk.

FIG. 6 depicts one of the adhesive stickers from FIG. 5 in use on a conventional compact disk 240, which is identical to disk 40 of FIG. 2. In FIG. 6, like numbering has been retained for the features that are shared with disk 40 of FIG. 2, except the FIG. 6 numbering additionally includes a "2" prefix indicating the use of an adhesive sticker from FIG. 5. Sticker 202 resides in the central ring area 244 where it has been placed through the use of labeling system 50, as depicted in FIG. 3. The central hole defined by cut line 212 is aligned with hole 242.

Figure 7:
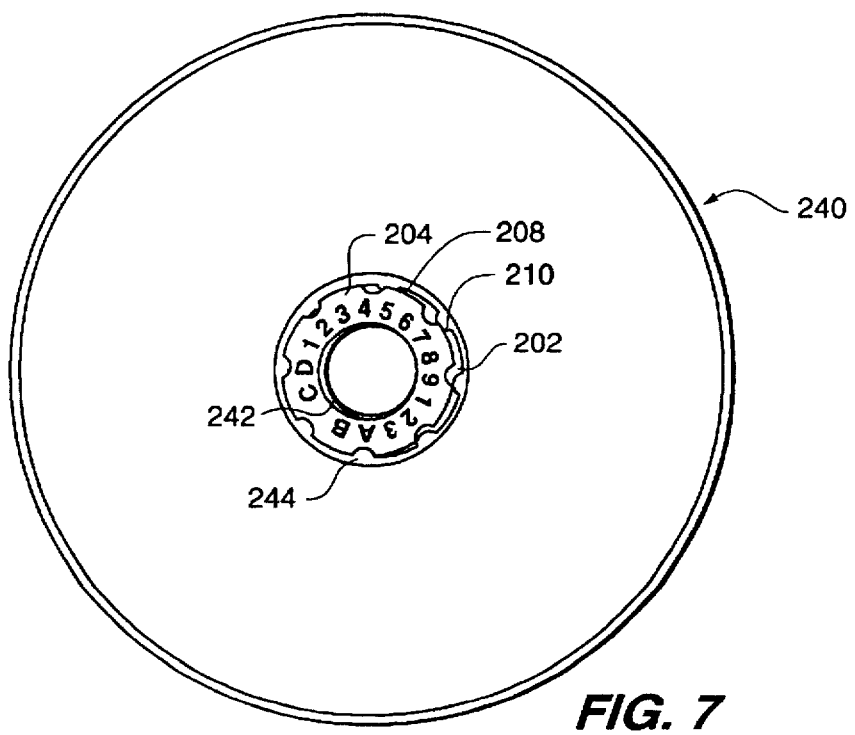
FIG. 7 depicts the compact disk of FIG. 5 with a second adhesive sticker installed to reveal a sticker alignment problem.

FIG. 7 depicts disk 240 with another adhesive sticker, sticker 204, positioned atop sticker 202. FIG. 7 illustrates certain advantages that the FIG. 5 sticker construction has over the FIG. 2 embodiment. Upon discovering that sticker 202 is a destructible sticker, a thief who has stolen disk 240 may simply try to hide the evidence of theft by covering sticker 202 with a second sticker (namely, sticker 204). It is extremely difficult, if not impossible, to apply these stickers without the system 50 apparatus depicted in FIG. 3 or a homologue thereof. For example, bubbles or other surface irregularities are commonly formed in the stickers when attempts are made to apply them by hand, or the stickers tear because they are so thin.

A thief attempting to use system 50 for application of the FIG. 5 stickers is hindered by a plurality of alignment problems that are inherent to the way in which the FIG. 5 stickers are constructed. A first alignment problem is the eccentricity of between the respective stickers along their respective cut lines 212 (proximal to hole 242) and 208 (at the sticker outer circumferences). A second alignment problem exists between the respective notches of stickers 202 and 204. Specifically, the notches of sticker 204 are not superimposed over the corresponding notches of sticker 202. Thus, it is readily apparent that an attempt has been made to disguise sticker 202 through placement of sticker 204, but the structural features of the stickers have prevented successful disguise. These structural features include a central opening along cut line 212 that is larger than central hole 242 (within the range of tolerances noted above for sticker 20) and outer notches, such as notch 210.

Figure 8:
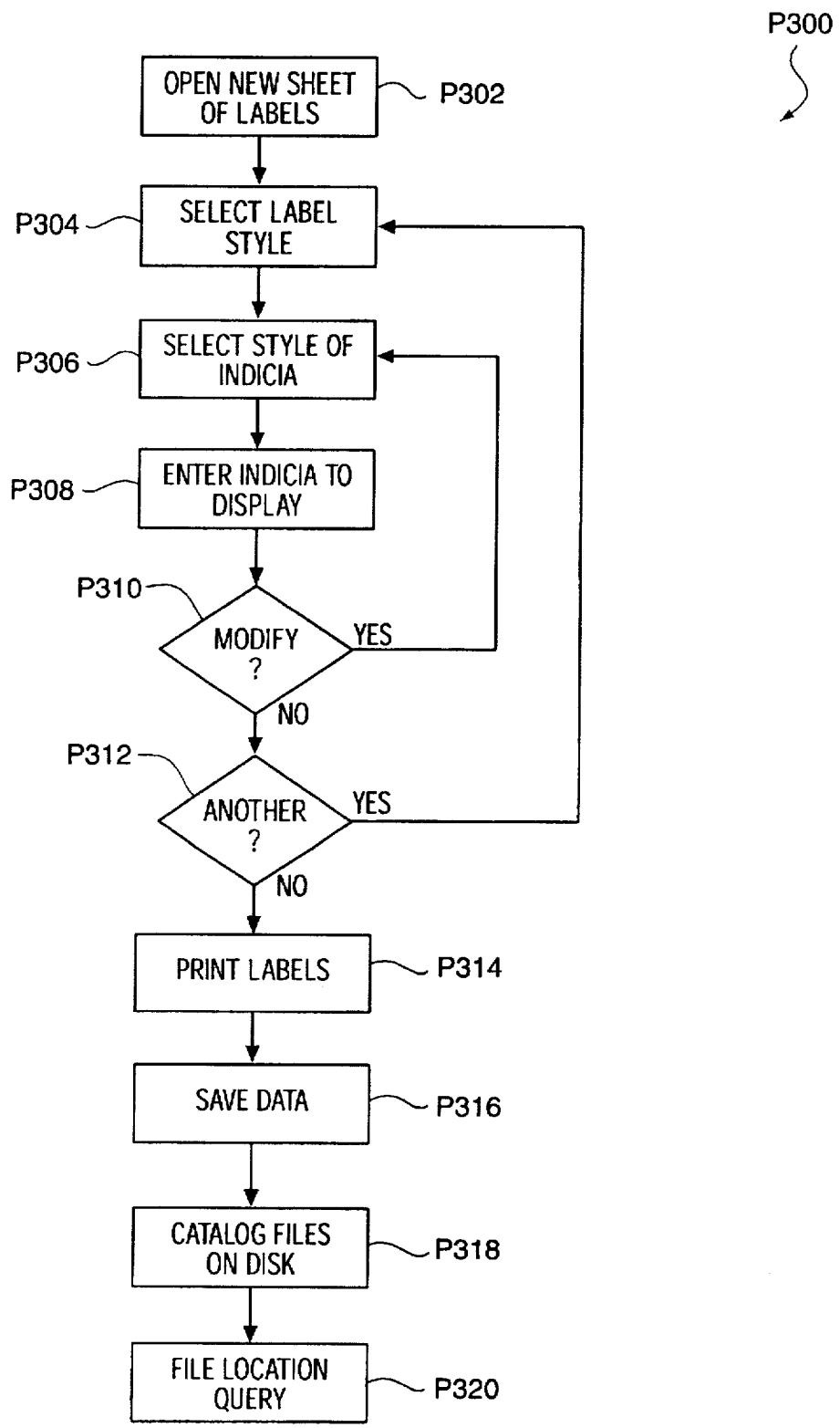
FIG. 8 depicts a schematic flow chart governing the operation of a computer program used to generate indicia for adhesive stickers such as those depicted in FIGS. 1 and 5.

FIG. 8 depicts a process control diagram or flow chart governing the operation of a computer that is programed to print labels, such as labels 20, 202, 204, and 206. A commercially available laser printer or thermal color printer is preferably used to print indicia on the labels. Computer program 300 begins at step P302, which includes opening a data file corresponding to a new sheet of labels.

Step P304 includes selecting one of a number of preformatted sticker sheet options or styles. For example, the stickers may be printed on a precut sheet 200 to produce stickers having the style including notches 210 (as depicted in FIG. 5). Another style includes a continuous strip consisting of one or two rows of adjacent stickers. Yet another style includes substitution of sticker 20 for the notched design of stickers 202–206 in FIG. 5. The label style may also be provided from a data file upon which a user has previously worked.

Step P306 includes selecting a style of indicia to be printed. The indicia style includes a choice between bar code and text. If text is selected, the indicia style includes a font selection. If bar code is selected, the indicia style includes a conventional type of bar code.

Step P308 includes entry of the indicia to be printed. In the case of text, the indicia preferably identifies the disk owner and sequence number, e.g., J. Doe Disk 7. Where the user desires to print multiple stickers, program 300 in step P308 offers the user the option of entering each identifier by hand or automatically incrementing the sequence number (e.g., J. Doe 8, J. Doe 9, ... ). Program 300 also can translate this identifier into bar code if it is desired to use the compact disk in a robotic library. Alternatively, program 300 may retrieve a serial number from the compact disk for use as the identifier. This serial number can be converted into bar code. The computer provides a visual display of the indicia in final form before exiting step P308.

In step P310, the program asks the user whether the displayed image should be modified. If yes, then step P306 is repeated. If no, then step P312 begins. In step P310, the computer also searches a computer database (the subject of steps P316 and P318) to determine whether the indicia constitutes a unique disk identifier in the database. If the identifier is not unique, the user is afforded the opportunity to modify the indicia before proceeding or to print just one additional label.

Step P312 includes asking the user whether it is desirable to print another sheet of labels. If yes, then step P304 is repeated. If no, then step P314 begins.

Step P314 includes the computer printing the indicia entered in step P308 on a precut sheet of the type designated in step P304.

In step P316, the computer saves the data corresponding to the printed labels, in order to permit recall of the data file in step P304.

In step P318, the compact disk that is to be labeled is preferably present. The disk is placed in a corresponding compact disk drive on the computer where it is read to identify all of the files that are stored on the disk. These file names are preferably saved in a database having a structure corresponding to the path names of the data files.

Compact disks that can be written on and read from are likely to become widely accepted and used in the near-term future as disk drive manufacturers lower their sales price through reductions in their unit cost of production. A single compact disk potentially holds up to about one gigabyte of data. Thus, data file management will become extraordinarily complex for the average user. Specifically, the average user is soon to be confronted with the task of identifying which one of several large capacity disks contains the desired data file. Therefore, step P318 preferably includes a continual process of updating the catalog or database to reflect storage changes as they are being made. This task can be accomplished through a memory-resident portion of program 300 and appropriate interaction with the computer operating system. It is noted that the operating system known as Windows 95 (a trademark of Microsoft Corporation) has various indexing features which facilitate updating of the database in step P318. Thus, the preferred hardware for use of program 300 is any commercially available personal computer system having a compact disk drive installed, any visual display (e.g., a CRT), and a laser printer operably connected to the computer.

In step P320, the user accesses the computer database, and conducts a query to identify the location of a selected data file. The database associates the indicia entered in step P308 with the data file, and supplies the user with the indicia. The user searches a plurality of disks to select the one disk bearing the unique printed indicia associated with the data file.

Figure 9:
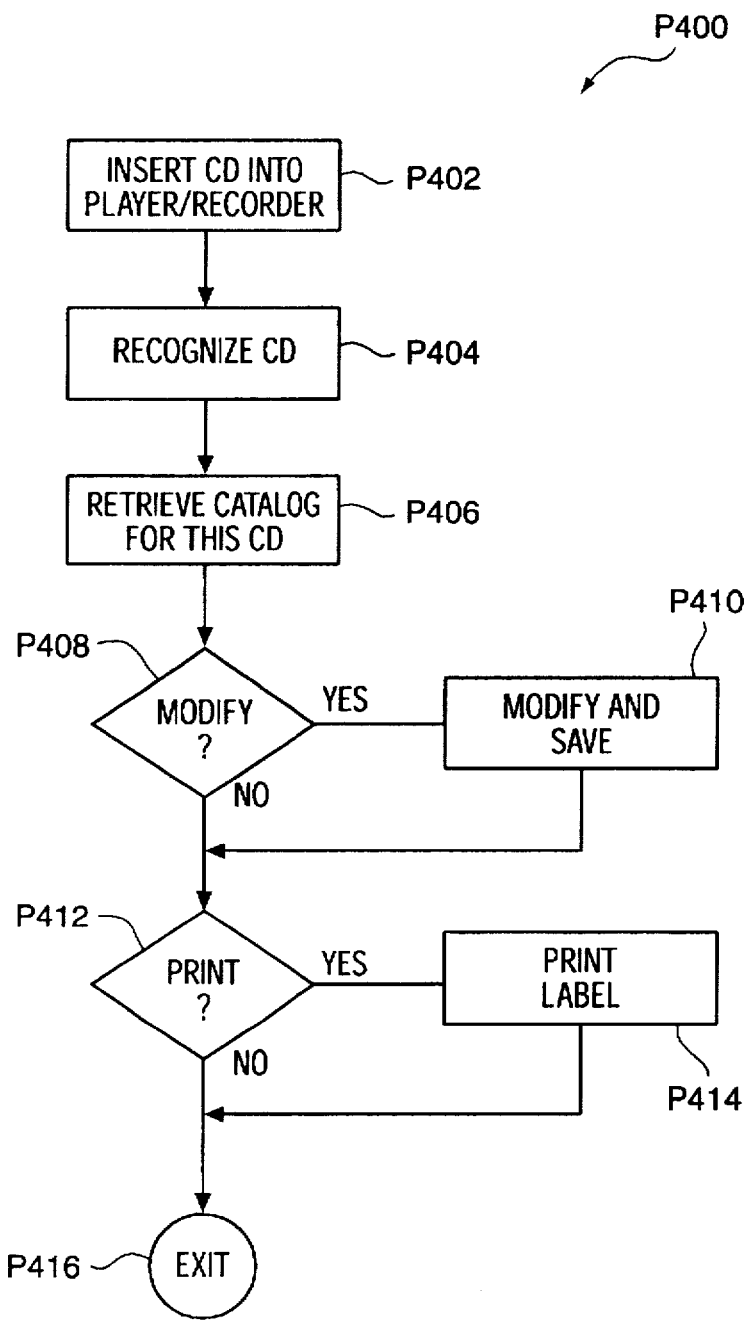
FIG. 9 depicts a schematic flow chart governing the use of the labeling system.

The data content of a writeable compact disk changes with use of the disk, and it sometimes becomes necessary to periodically update the database. Thus, FIG. 9 depicts a method P400 of updating the database to reflect the fact that a compact disk contains new information. Method 400 is preferably embodied in a memory-resident program that is accessed each time a compact disk is placed in a drive mechanism. In step P402, the user inserts a compact disk into a drive mechanism, e.g., a player or recorder.

In step P404, the player retrieves information from the inserted disk, and passes this information to a computer that uses the information to recognize the disk. For example, a conventional data signature may be obtained using a statistical comparative analysis technique, or the player may retrieve an electronic identifier (e.g., a serial number) that has been written to the disk.

In step P406, the computer associates the disk identifier with a data file catalog from its database, and retrieves the catalog. In step P408, the computer provides the user with an option to update the database to reflect the new informational content of the disk. If yes, the database is updated to reflect the files that are currently stored on the compact disk in step P410.

In step P412, the computer provides the user with an option to print a new label reflecting the date on which the database update occurred. If yes, the label is printed in step P414 and the program terminates in step P416. If no, the program terminates in step P416.

Those skilled in the art understand that the preferred embodiments, as hereinabove described, may be subjected to apparent modifications without departing from the true scope and spirit of the invention. The inventors, accordingly, hereby state their intention to rely upon the Doctrine of Equivalents, in order to protect their full rights in the invention.

We claim:

1. An adhesive sticker for use in identifying compact disks, said sticker comprising:

a rounded sheet of material having structure defining a central circular aperture of a diameter greater than 15 mm, said rounded sheet of material having a thickness less than 0.4 mm, said rounded sheet of material having an outer diameter of less than 30 mm;

said rounded sheet of material having a first face bearing printed indicia thereon, said printed indicia including an identifier;

said rounded sheet of material having a second face remote from said first face, said second face being coated with an adhesive; and said rounded sheet of material including means for inducing misalignment between said rounded sheet of material and an identically shaped sheet of material adhered to the central portion of a compact disk as said rounded sheet of material is adhered to said compact disk atop said identically shaped sheet of material, wherein said misalignment inducing means includes a plurality of irregular features formed in the outer margin of said rounded sheet of material.

2. The sticker as set forth in claim 1 wherein said irregular features include notches formed in an outer margin of said rounded sheet of material.

3. The sticker as set forth in claim 1 wherein said misalignment inducing means includes said central circular aperture having a diameter at least 0.5 mm greater than the diameter of a central hole in said compact disk.

4. The adhesive sticker as set forth in claim 1 wherein said printed indicia includes an identifier for use in retrieving data catalog information from a database including a catalog listing of data files on said disk.

* * * * *